(12) United States Patent
Watanabe et al.

(10) Patent No.: US 9,885,500 B2
(45) Date of Patent: Feb. 6, 2018

(54) MAGNETIC HEAT PUMP SYSTEM AND AIR-CONDITIONING SYSTEM USING THAT SYSTEM

(71) Applicant: DENSO CORPORATION, Kariya, Aichi-pref. (JP)

(72) Inventors: Naoki Watanabe, Nagoya (JP); Takuya Fuse, Nagoya (JP); Shinichi Yatsuzuka, Nagoya (JP); Kazutoshi Nishizawa, Toyoake (JP); Tsuyoshi Morimoto, Oobu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 474 days.

(21) Appl. No.: 13/909,305

(22) Filed: Jun. 4, 2013

(65) Prior Publication Data
US 2013/0327062 A1 Dec. 12, 2013

(30) Foreign Application Priority Data
Jun. 6, 2012 (JP) .................................. 2012-128820

(51) Int. Cl.
*F25B 21/00* (2006.01)
(52) U.S. Cl.
CPC ...... *F25B 21/00* (2013.01); *F25B 2321/0022* (2013.01); *Y02B 30/66* (2013.01)
(58) Field of Classification Search
CPC ..... F25B 21/00; F25B 2321/002; Y02B 30/66
(Continued)

(56) References Cited

U.S. PATENT DOCUMENTS 5,249,424 A * 10/1993 DeGregoria ............ F25B 21/00
62/3.1
7,481,064 B2 * 1/2009 Kitanovski ............. F25B 21/00
62/3.1
(Continued)

FOREIGN PATENT DOCUMENTS

JP 2006-131180 5/2006
JP 4284183 B2 3/2009
(Continued)

OTHER PUBLICATIONS

Office action dated Mar. 18, 2014 in corresponding Japanese Application No. 2012-128820.

*Primary Examiner* — Frantz Jules
*Assistant Examiner* — Steve Tanenbaum
(74) *Attorney, Agent, or Firm* — Harness, Dickey & Pierce, P.L.C.

(57) ABSTRACT

A magnetic heat pump system which arranges permanent magnets at the two sides of a magnetocalorific effect material to thereby strengthen the magnetic field to improve the cooling and heating ability, which magnetic heat pump system uses first and second magnets which move inside and outside of the containers in the state facing each other to change a magnitude of a magnetic field which is applied to a plurality of containers in which a magnetocalorific effect material is stored so as to change a temperature of a heat transport medium which is made to flow through the containers by a reciprocating pump, the intensity of the magnetic field which is applied to the magnetocalorific effect material in the containers being increased to enlarge the change of temperature of the heat transport medium which is discharged from the magnetic heat pump and improve the cooling and heating efficiency.

22 Claims, 8 Drawing Sheets

(58) Field of Classification Search
USPC .......................................................... 62/3.1
See application file for complete search history.

(56) References Cited

U.S. PATENT DOCUMENTS

| | | | |
|---|---|---|---|
| 8,138,873 B2* | 3/2012 | Zhang | H01F 7/0205 335/219 |
| 2003/0106323 A1 | 6/2003 | Zimm et al. | |
| 2011/0067415 A1* | 3/2011 | Mao | F25B 21/00 62/3.1 |
| 2011/0289937 A1 | 12/2011 | Muller et al. | |
| 2012/0272665 A1* | 11/2012 | Watanabe | F25B 21/00 62/3.1 |

FOREIGN PATENT DOCUMENTS

| | | | |
|---|---|---|---|
| JP | 2010-112606 | | 5/2010 |
| JP | 2010112606 A | * | 5/2010 |
| JP | 2011-505543 | | 2/2011 |

* cited by examiner

MAGNETIC HEAT PUMP SYSTEM AND AIR-CONDITIONING SYSTEM USING THAT SYSTEM

BACKGROUND OF THE INVENTION

1. Field of the Invention

The present invention relates to a magnetic heat pump system and to an air-conditioning system which uses that system.

2. Description of the Related Art

Known in the art is a magnetic heat pump system (also called a "magnetic refrigerating system") which uses a magnetocalorific material as a work element. A magnetic heat pump system, compared with a refrigeration technique which utilizes conventional gas compression and expansion, that is, a gas heat pump system, does not use Freon or Freon alternatives, so is environmentally friendly. Further, in a magnetic heat pump system, the compression process or the expansion process using a compressor which was necessary for the gas heat pump system is unnecessary, so the energy efficiency is high. The only components which are required for a magnetic heat pump system are a pump which runs a fluid through a magnetocalorific effect material for heat exchange and a magnetic field applying device which imparts a change in magnetic field to the magnetocalorific effect material.

A magnetocalorific effect material which is used for a magnetic heat pump system has the characteristic of changing in temperature when a magnetic field is applied. Explained in further detail, a magnetocalorific effect material exhibits the phenomenon of becoming warmer when a magnetic field is applied and of becoming cooler when the magnetic field is removed (magnetocalorific effect). A rotary magnet type magnetic refrigerator which uses such a magnetocalorific material is disclosed in Japanese Patent No. 4284183. Further, it is known to apply a magnetic heat pump system to a vehicular air-conditioning system, for example, a heat pump system of an air-conditioning system of an automobile or railroad car.

SUMMARY OF THE INVENTION

However, in the rotary magnet type magnetic refrigerator which is disclosed in Japanese Patent No 4284183, a magnetic circuit which is made by two magnets attached on a shaft with their opposite pole facing each other is made to rotate so as to apply and remove a magnetic field to and from a magnetocalorific effect material, but the flow of a heat transport medium to the magnetocalorific effect material container is bent vertically. For this reason, in the rotary magnet type magnetic refrigerator which is disclosed in Japanese Patent No. 4284183, at the time of high speed rotation of the magnetic circuit, there were the problems that the pressure loss became greater, the efficiency fell, and the cooling ability and heating ability fell.

The present invention, in consideration of the present problems, provides a magnetic heat pump system which can improve a magnetic circuit which applies a magnetic field to a magnetocalorific effect material so as to improve heat generating and cooling performances of the magnetocalorific effect material and provides an air-conditioning system which uses such a magnetic heat pump system.

To solve the above problem, there is provided a magnetic heat pump system which comprises material containers (25) inside of which a magnetocalorific effect material (26) which has a magnetocalorific effect is arranged and inside of which a heat transport medium circulates, magnetic field changing means (22) for changing a magnitude of a magnetic field which is applied to the magnetocalorific effect material (26), heat transport medium moving means (13) for making the heat transport medium move back and forth between the two ends of the material containers (25), heat absorbing means (2) for making the heat transport medium which is discharged from one end sides of the material containers (25) absorb heat of the outside, and heat radiating means (5) for radiating to the outside the heat which the heat transport medium which is discharged from the other end sides of the material containers (25) has, the magnetic heat pump system characterized in that the magnetic field changing means (22) are provided with first magnets (23) and a yoke which are arranged at one sides of the material containers (25), second magnets (43) and a yoke which are arranged at the other sides of the material Containers (25) so as to face the first magnets (23) with different poles, a drive means (20) which is coupled with the first magnets (23) and yoke, and a holding mechanism (41) which holds the second magnets (43) and a yoke so as to rotate following the first magnets (23) and yoke.

Further, there is provided an air-conditioning system (10) which uses a magnetic heat pump system (30), wherein a heat absorbing means (2) is arranged as a cooler unit at an upstream side of a cooling passage (3) of an air-conditioning system (10) and wherein a heat radiating means (5) is arranged as a heater unit in a heating passage (4) which is positioned at a downstream side of an air mix damper (7) which controls an amount of intake of air-conditioned air which passes through the heat absorbing means (2).

Note that, the above reference notations are illustrations which show the correspondence with specific examples described in the embodiments explained next.

BRIEF DESCRIPTION OF THE DRAWINGS

The present invention may be more fully understood from the description of preferred embodiments of the invention as set forth below, together with the accompanying drawings.

DESCRIPTION OF THE PREFERRED EMBODIMENTS

Below, referring to the drawings, embodiments of the present invention will be explained. In the embodiments, parts of the same configuration are assigned the same reference notations and explanations are omitted.

Figure 1:
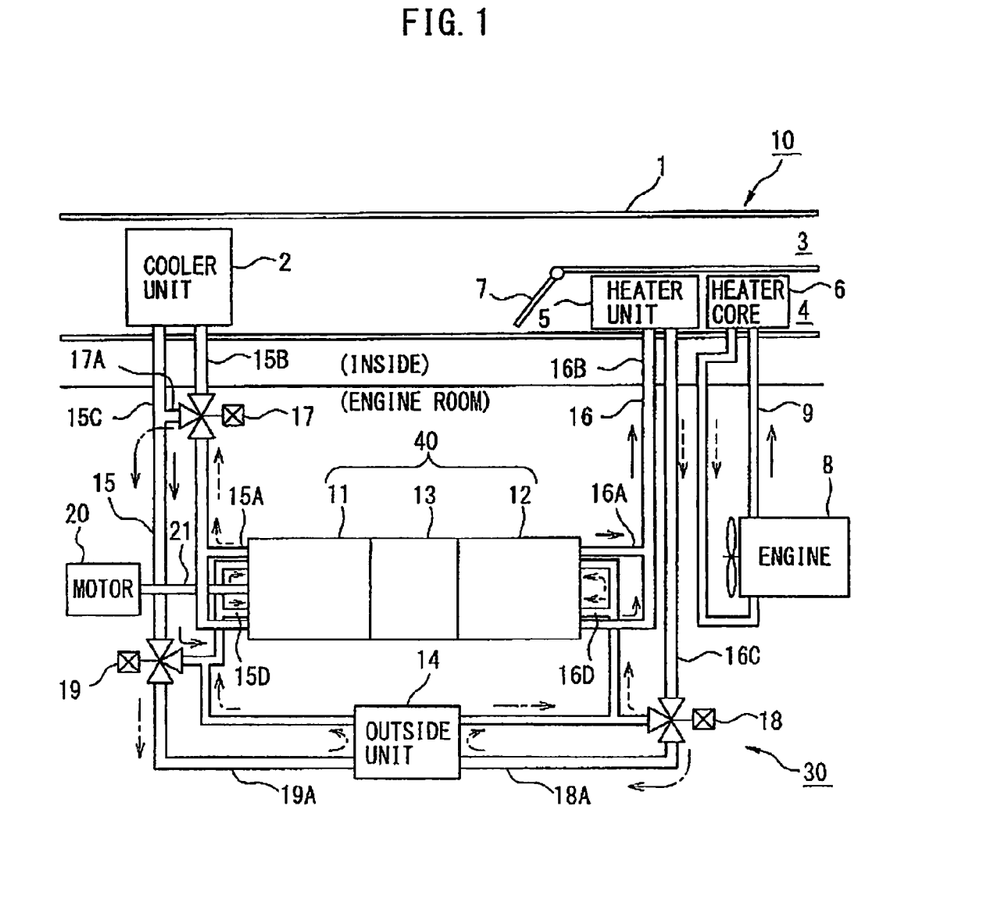
FIG. 1 is an overall view of the configuration which illustrates one embodiment of a magnetic heat pump system according to the present invention mounted on a vehicular air-conditioning system.

FIG. 1 illustrates the configuration of a vehicular air-conditioning system 10 using a magnetic heat pump system 30 according to the present invention. The air-conditioning system 10 is installed inside of the vehicle and has a cooler unit 2 in an air flow path 1 of the same as a heat absorbing means. Further, at a downstream side of the cooler unit 2, there are a cooling passage 3 and a heating passage 4 which is provided with a heater unit 5 and a heater core 6 as a heat radiating means. Further, at the inlet parts of the cooling passage 3 and the heating passage 4, an air mix damper 7 is provided. Along with movement of the air mix damper 7, the air which passes through the cooler unit 2 is controlled to flow through the cooling passage 3 or to flow through the heating passage 4.

On the other hand, inside the engine compartment of a vehicle, there are a components which are operated by a shaft 21 which is rotated by a motor 20 (a drive means) such as a cooling water manufacturing part 11, warm water manufacturing part 12, and a reciprocating pump 13 which is a heat transport medium moving means. The internal structure of the cooling water manufacturing part 11, warm water manufacturing part 12, and reciprocating pump 13 will be explained later. The cooling water manufacturing part 11 cools the heat transport medium by magnetic action. The heat transport medium which was cooled by the cooling water manufacturing part 11 is discharged to a cooling water circulating path 15 by the reciprocating pump 13, is supplied to the cooler unit 2, then returns to the cooling water manufacturing part 11. Conversely, the warm water manufacturing part 12 heats the heat transport medium by magnetic action. The heat transport medium which is heated by the warm water manufacturing part 12 is discharged by the reciprocating pump 13 to a warm water circulating path 16, is supplied to the heater unit 5, and returns to the warm water manufacturing part 12.

On the other hand, in the air-conditioning system 10, the heater core 6 which is provided at the heating passage 4 is supplied through the coolant circulating path 9 with cooling water (coolant) which was warmed by cooling the engine 8, whereby the air which passes through the heater unit 5 and the heating passage 4 is warmed. The heater core 6 is not directly related to the present invention, so further explanation of the heater core 6 will be omitted.

Here, the configuration of the cooling water circulating path 16 and the warm water circulating path 16 will be explained in detail. At the cooling water manufacturing part 11, there are a plurality of cylinders. At each cylinder, a runner 15A is connected. A plurality of runners 15A are collected to form a feed pipe 15B. A heat transport medium is supplied from the feed pipe 15B to the cooler unit 2. The heat transport medium which is discharged from the cooler unit 2 is returned by the return pipe 15C to the cooling water manufacturing part 11, is distributed to the runners 15D which are connected to the cylinders, and is returned to the cylinders. Between the feed pipe 15B and the return pipe 15C, a bypass pipe 17A which bypasses the cooler unit 2 is provided. The bypass pipe 17A is directly connected to the return pipe 15C, but is connected to the feed pipe 15B through a first flow path switching valve 17.

At the time of heating, by switching the first flow path switching valve 17, the heat transport medium which flows through the feed pipe 15B can be returned to the cooling water manufacturing part 11, without going through the cooler unit 2, by going through the bypass pipe 17A. Furthermore, at the upstream side of the runner 15D of the return pipe 15C, there is a third flow path switching valve 19. At the third flow path switching valve 19, a detour pipe 19A which returns to the return pipe 15C through the outside unit 14 is connected. At the time of heating, the third flow path switching valve 19 is switched so that the heat transport medium which flows through the return pipe 15C flows from the third flow path switching valve 19 to the detour pipe 19A, absorbs heat from the outside air at the outside unit 14, and flows again from the detour pipe 19A to the return pipe 15C. The heat transport medium which again flows to the return pipe 15C returns to the cooling water manufacturing part 11.

Similarly, at the warm water manufacturing part 12, there are a plurality of cylinders which heat the heat transport medium to obtain warm water. At the cylinders, runners 16A are connected. A plurality of runners 16A are collected to form a feed pipe 16B which supplies the heat transport medium to the heater unit 5. The heat transport medium which is discharged from the heater unit 5 is returned by the return pipe 16C to the warm water manufacturing part 12, distributed to the runners 16D which are connected to the cylinders, and is returned to the cylinders. At the return pipe 16C at the upstream side of the runner 16D, there is a second flow path switching valve 18. At the second flow path switching valve 18, a detour pipe 18A which returns the heat transport medium through the outside unit 14 to the return pipe 16C is connected. By switching the second flow path switching valve 18, the heat transport medium which flowed though the return pipe 16C can flow to the detour pipe 18A before returning to the warm water manufacturing part 12, absorb heat from the outside air at the outside unit 14, and return to the warm water manufacturing part 12.

Figure 2A:
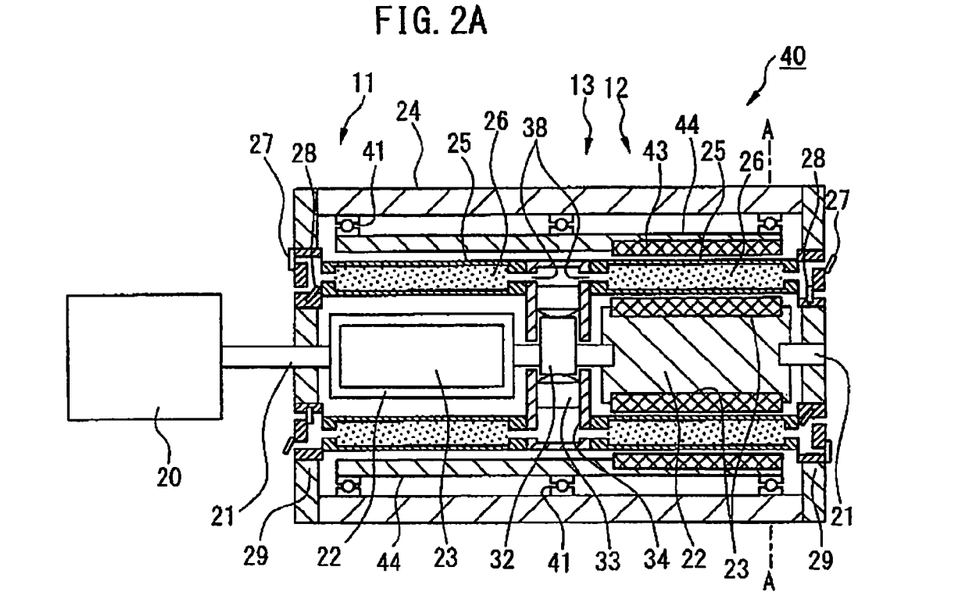
FIG. 2A is a cross-sectional view which illustrates a first embodiment of the magnetic heat pump system which is illustrated in FIG. 1.
Figure 2B:
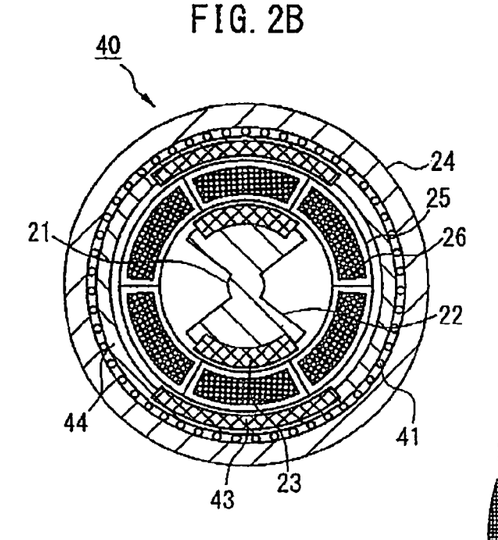
FIG. 2B is a local cross-sectional view along the line A-A of the magnetic heat pump system which is illustrated in FIG. 2A.

FIG. 2A is a cross-sectional view which illustrates a first embodiment of a magnetic heat pump 40 in the magnetic heat pump system 30 which is illustrated in FIG. 1. Further, FIG. 2B is a local cross-sectional view along the line A-A of the magnetic heat pump 40 which is illustrated in FIG. 2A.

Figure 2C:
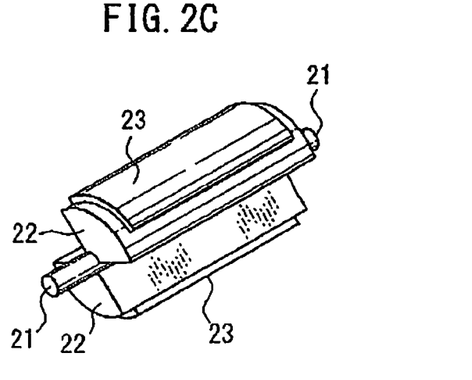
FIG. 2C is a perspective view which illustrates one example of the configuration of a rotor which is provided with magnets which are illustrated in FIG. 2A.
Figure 2D:
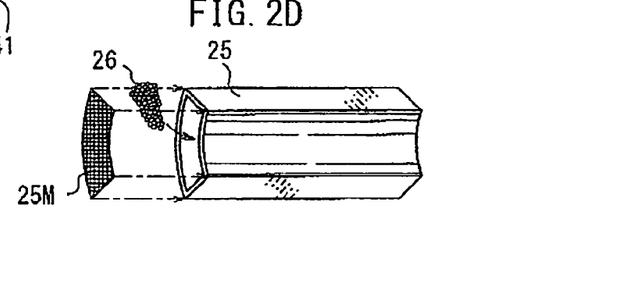
FIG. 2D is an assembled perspective view which illustrates one example of a material container which holds a magnetocalorific effect material which is illustrated in FIG. 2A.

Furthermore, FIG. 2C is a perspective view which illustrates one example of the configuration of a rotor 22 which is provided with magnets 23 which are illustrated in FIG. 2A, while FIG. 2D is an assembled perspective view which illustrates the configuration of one example of a material container 25 which holds the magnetocalorific effect material 26 which is illustrated in FIG. 2A.

In the first embodiment which is illustrated in FIG. 2A, for the reciprocating pump 13, a radial piston pump is used, but as the reciprocating pump 13, a swash plate compressor may also be used. The structures of the cooling water manufacturing part 11 and the warm water manufacturing part 12 which are attached to the reciprocating pump 13 at opposite sides to the right and left are the same. The cooling water manufacturing part 11 is provided with a cylindrical shell 24 which is arranged concentrically with the shaft 21. A cross-sectional fan-shaped rotor 22 such as illustrated in FIGS. 2B and 2C is provided facing the shaft 21. Further, at the outer circumferential surface of the rotor 22, permanent magnets 23 are attached. One of the permanent magnets 23 is arranged with the N pole at the outside, while the other is arranged with the S pole at the outside.

Further, between the outside of the path of rotation of the permanent magnets 23 and the inner. circumferential surface of the shell 24, a plurality of material containers 25 in which a magnetocalorific effect material 26 is filled and a cylindrical yoke part 44 are arranged. The outer circumferential surface of the yoke part 44 is held rotatably at the inner circumferential surface of the shell 24 by a holding mechanism comprised of ball bearings 41. Further, it is also possible to omit the ball bearings and use a lubricating oil layer or air layer. Furthermore, at the inner circumferential surface of the yoke part 44, permanent magnets 43 are attached at positions which face the permanent magnets 23 which are attached to the outer circumferential surface of the rotor 22. One of the permanent magnets 43 faces a permanent magnet 23 which is arranged with the N pole at an inner side and which is arranged with the S pole at an outer side attached to the outer circumferential surface of the rotor 22. Further, the other of the permanent magnets 43 faces a permanent magnet 23 which is arranged with the S pole at an inner side and with an N pole at an outer side attached to the outer circumferential surface of the rotor 22.

Each material container 25, as illustrated in FIG. 2D, is tubular shaped with an outer shape of a fan-shaped cross-section. The inside space is filled with a pellet-shaped magnetocalorific effect material 26. The two end parts are closed by mesh-like end plates 24M so as to seal in the magnetocalorific effect material 26. Liquid can enter the inside of the material container 25 from one end through an end plate 25M, run through the clearances in the magnetocalorific effect material 26, and be discharged to the outside from the end part at the opposite side through another end plate 25M.

In the first embodiment, six material containers 25 of the same shape are arranged, at the inner circumferential surface of the yoke part 44. The permanent magnets 23 which are attached to the outer circumferential surfaces of the rotor 22 rotate over the inner circumferential surface sides of the material containers 25. Further, along with the rotational movement of the permanent magnets 23, the rotary magnets 43 which face the permanent magnets 23 move following them by the attraction force acting between the magnets and therefore the yoke part 44 rotates. The rotor 22, facing permanent magnets 23 and 43 and yoke part 44 function as magnetic field changing means for imparting a magnetic field to the magnetocalorific effect material 26 which is filled in the material containers 25. The intensity of the magnetic field which is applied to the magnetocalorific effect material 26 which is filled in the material containers 25 is improved 30 to 60% compared with the case where permanent magnets 23 are provided only at the insides of the magnetocalorific effect material 26.

If returning to FIG. 2A and continuing the explanation, in the first embodiment, the reciprocating pump 13 is comprised of a radial piston pump. The body of the radial piston pump 13 is formed integrally with the cooling water manufacturing part 11 and warm water manufacturing part 12. At the radial piston pump 13, six cylinders 34 are provided in radiating shapes from the shaft 21 matching the number of the material containers 25 at the cooling water manufacturing part 11. Inside of the cylinders 34, reciprocating pistons 33 are provided.

On the other hand, at the shaft 21 which is rotated by the motor 20, a control cam 32 is attached eccentric to the shaft 21. The pistons 33 are engaged with the cam profile of the control cam 32. Due to the cam profile of the control cam 32, when the control cam 32 turns once, the pistons 33 in the cylinders 34 can be made to reciprocate. In the first embodiment, there are two poles of permanent magnets 23, so when the rotor 22 turns once, the control cam 32 is used to make the pistons 33 reciprocate two times. The side faces of the cylinders 34 at the sides far from the shaft 21 are connected to the end faces of the material containers 25 of the cooling water manufacturing part 11 and warm water manufacturing part 12 by connecting passages 38.

In the first embodiment which is illustrated in FIG. 2A, at the end face of the cooling water manufacturing part 11 at the side far from the radial piston pump 13, an end face plate 29 is attached. At the end face plate 29, intake valves 28 which guide the heat transport medium to the end faces of the material containers 25 and discharge valves 27 which discharge the heat transport medium which is exhausted from the end faces of the material containers 25 are provided. At each discharge valve 27, a runner 15A of the feed pipe 15S of the cooling water circulation path 15 which was explained in FIG. 1 is connected, while at each intake valve 28, a runner 15D of the return pipe 15C of the cooling water circulation path 15 which was explained in FIG. 1 is connected. Above, the structure of the cooling water manufacturing part 11 was explained, but when the reciprocating pump 13 is a radial piston pump, the positions of the permanent magnets 23 at the cooling water manufacturing part 11 and the warm water manufacturing part 12 with respect to the shaft 21 are off by 90 degrees.

In the warm water manufacturing part 12 which is configured in the same way as the configuration of the cooling water manufacturing part 11 as explained above, at each discharge valve 27 at the end face plate 29 at the opposite side to the reciprocating pump 13, a runner 16A of the feed pipe 16S of the warm water circulating path 16 which was explained in FIG. 1 is connected, while at each intake valve 28, a runner 16D of the return pipe 16C of the warm water circulating path 16 which was explained in FIG. 1 is connected. Further, in the reciprocating pump 13, if a piston 33 operates and the heat transport medium is sucked in at a certain material container 25 of the cooling water manufacturing part 11, if the reciprocating pump 13 is a radial piston pump, the heat transport medium is similarly sucked in at the corresponding material container 25 of the facing warm water manufacturing part 12.

At the cooling water manufacturing part 11 side, when the heat transport medium is discharged from a material container 25, due to elimination of the magnetic field which had been applied to the magnetocalorific effect material 26 inside the material container 25, the temperature of the magnetocalorific effect material 26 falls and the discharged heat transport medium is cooled. The heat transport medium which had been cooled at each cooling container 25 is fed into the cooling water circulation path 15. Conversely, at the warm water manufacturing part 12 side, when the heat transport medium is discharged from a material container 25, due to the application of a magnetic field to the magnetocalorific effect material 26 inside the material containers 25, the magnetocalorific effect material 26 generates heat and the discharged heat transport medium is heated and supplied to the warm water circulating path 16. The permanent magnets 23 are arranged at the outer circumference of the rotor 22, while the permanent magnets 43 are arranged at the inner circumferential surface of the yoke part 44 so that the above such operation is performed.

Figure 3A:
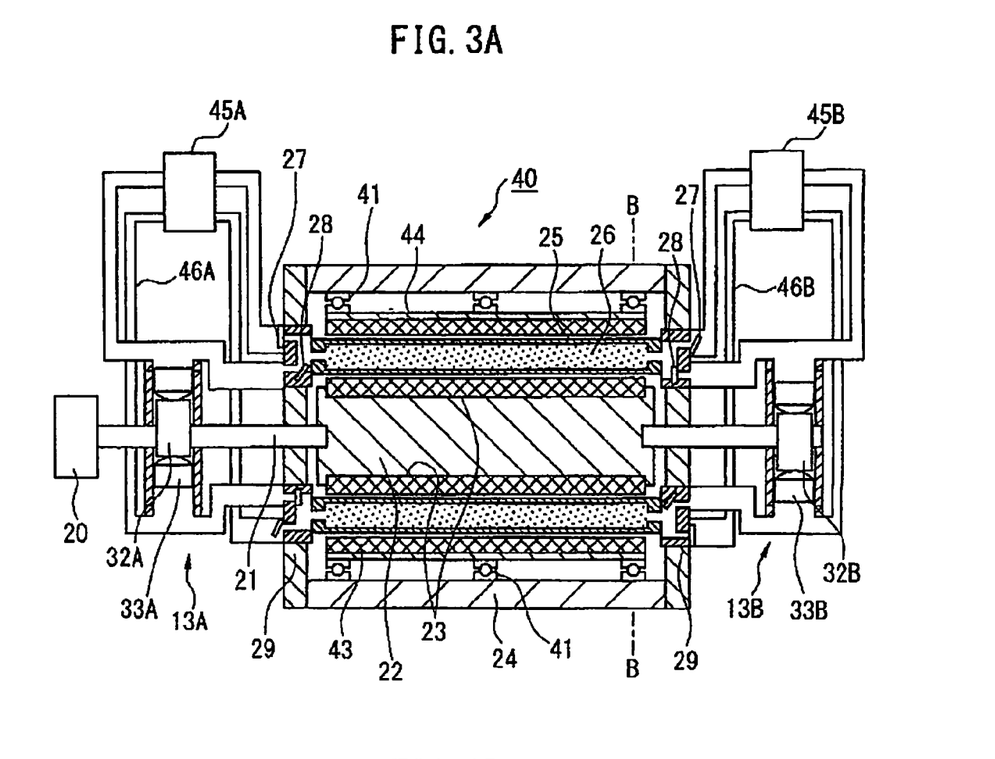
FIG. 3A is a cross-sectional view which illustrates a second embodiment of the magnetic heat pump system which is illustrated in FIG. 1.

FIG. 3A is a cross-sectional view which illustrates a second embodiment of a magnetic heat pump 40 in the magnetic heat pump system 30 which is illustrated in FIG. 1. In the magnetic heat pump 40 of the first embodiment, the reciprocating pump 13 was arranged at the part between the cooling water manufacturing part 11 and the warm water manufacturing part 12, but in the second embodiment, the two reciprocating pumps 13A and 13B are provided independently at the two sides of the magnetic heat pump 40. Therefore, the magnetic heat pump 40 of the second embodiment removes the reciprocating pump 13 and connects the cooling water manufacturing part 11 and the warm water manufacturing part 12 of the first embodiment. However, the rotor 22 is, for example, shaped by extension of the rotor 22 of the warm water manufacturing part 12. It is not shaped as a rotor of a different phase which is illustrated in FIG. 2A connected as it is.

The magnetic heat pump 40 of the second embodiment is provided with a shell 24 which is provided with the same diameter as the shell 24 of the first embodiment. Further, at the inner circumferential surface of the shell 24, a yoke part 44 is attached through ball bearings 41. The structure of permanent magnets 42 which face permanent magnets 23 at the outer circumferential surface of the rotor 22 being present at the inner circumferential surface of the yoke part 44 is the same as in the first embodiment. The point that one of the permanent magnets 43 faces a permanent magnet 23 which is arranged with the N pole at an inner side and which is arranged with the S pole at an outer side attached to the outer circumferential surface of the rotor 22 of an S pole and the other of the permanent magnets 43 faces a permanent magnet 23 which is arranged with the S pole at an inner side and with an N pole at an outer side attached to the outer circumferential surface of the rotor 22 is also the same.

The shape and number of the material containers 25 at the second embodiment are the same as in the first embodiment. The cross-section along the line B-B at the magnetic heat pump 40 of the second embodiment is the same as the cross-section along the line A-A at the magnetic heat pump 40 of the first embodiment which is illustrated in FIG. 2B. One end part of each material container 25 is connected through a discharge valve 27 or intake valve 28 to a medium passage 46A which is provided with a heat exchanger 45A, while the other end part is connected through a discharge valve 27 or an intake valve 28 to a medium passage 46B which is provided with a heat exchanger 45B. The medium passages 46A and 46B which are connected to the material containers 25 are respectively independent.

In the second embodiment as well, if the permanent magnets 23 which are attached to the outer circumferential surface of the rotor 22 rotate due to the motor 20, along with the rotation of the permanent magnets 23, the rotary magnets 43 which face the permanent magnets 23 rotate following them due to the attraction force of the magnets and therefore the yoke part 44 rotates. The intensity of the magnetic field which is applied to the magnetocalorific effect material 26 which is filled in the material containers 25 is 30 to 60% higher than the case where the permanent magnets 23 are provided only at the inside of the magnetocalorific effect material 26.

Figure 3B:
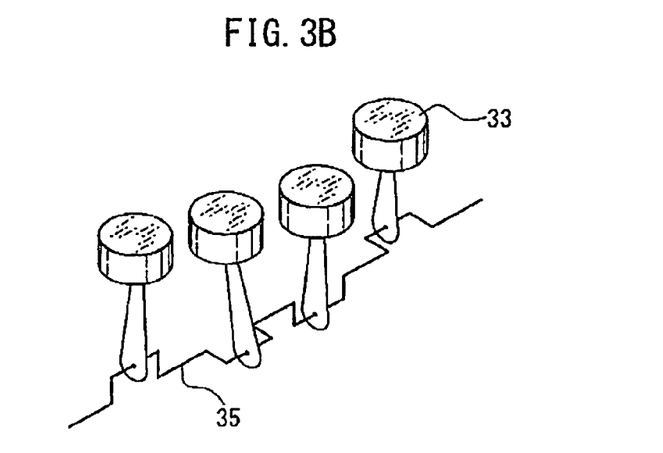
FIG. 3B is a schematic perspective view which illustrates the configuration of a reciprocating pump in the case of driving a piston of a reciprocating pump which is illustrated in FIG. 3A by a crankshaft.

Note that, in the magnetic heat pump 40 of the second embodiment which is illustrated in FIG. 3A, as the two reciprocating pumps 13A and 13B, radial piston pumps which are provided with pistons 33A and 33B which are driven by control cams 32A and 32B are illustrated. On the other hand, as the two reciprocating pumps 13A and 13B, instead of the radial piston pumps, as illustrated in FIG. 3B, it is also possible to use pistons which are driven by the crankshaft 35. In this case, it is also possible to couple the crankshaft 35 to the shaft 21 to drive the piston 33.

Figure 4A:
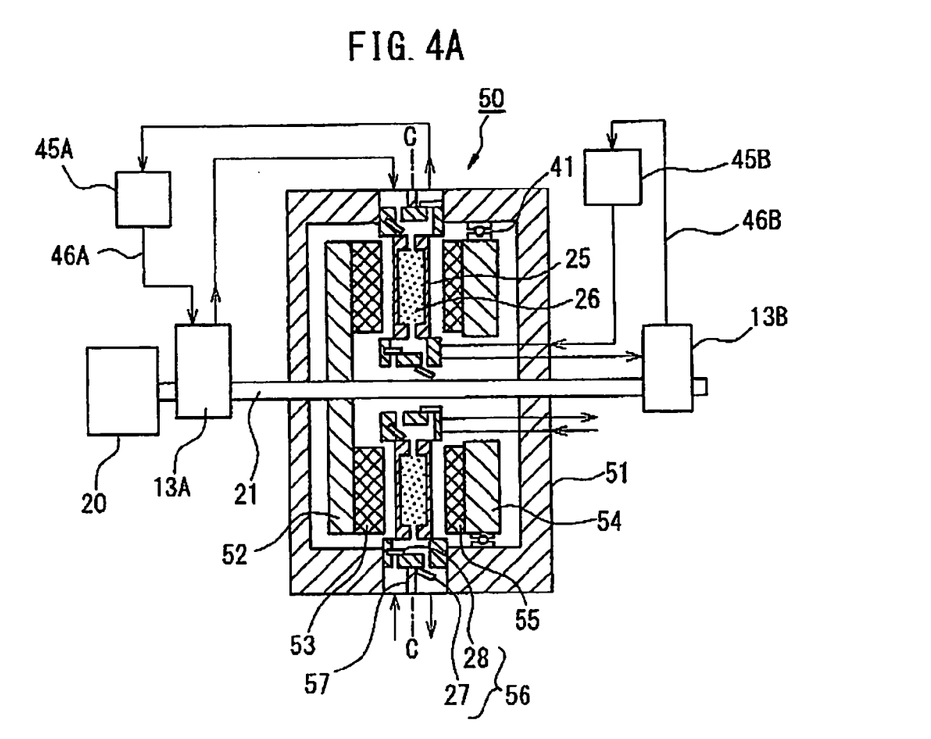
FIG. 4A is a cross-sectional view which illustrates a third embodiment of the magnetic heat pump system which is illustrated in FIG. 1.
Figure 4B:
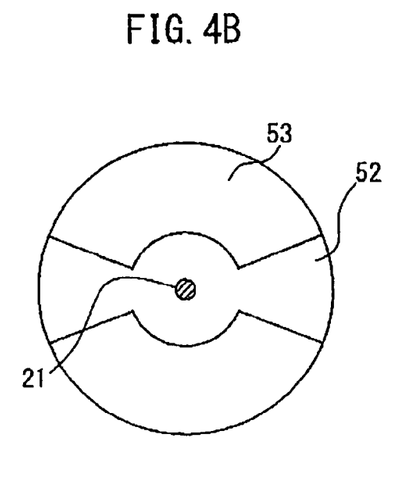
FIG. 4B is a plan view of a rotor unit of FIG. 4A.
Figure 4C:
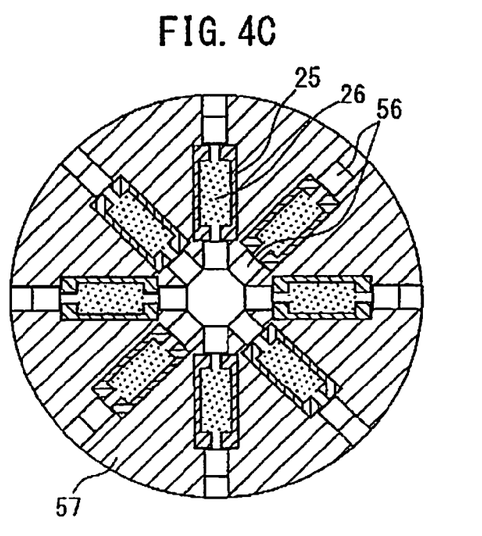
FIG. 4C is a cross-sectional view along a line C-C of FIG. 4A.

FIG. 4A is a cross-sectional view of a magnetic heat pump 50 which is illustrated in a third embodiment in the magnetic heat pump system 30 which is illustrated in FIG. 1. Further, FIG. 4B is a plan view of a rotor 22 which is illustrated in FIG. 4A, while FIG. 4C is a cross-sectional view along the line C-C of FIG. 4A. Further, in the third embodiment, the two reciprocating pumps 13A and 13B are the same in structure as the second embodiment, so illustration will be omitted. The medium flow paths 46A and 46B are illustrated by solid lines.

In the third embodiment as well, the two reciprocating pumps 13A and 13B which operate by the shaft 21 which is driven by the motor 20 are provided independently at the two sides of the magnetic heat pump 50. In the magnetic heat pump 50 of the third embodiment, at the side of the inside of the shell 51 near the motor 20, there is a disk-shaped rotor 52 which is attached to the shaft 21. At the other surface of the rotor 52, as illustrated in FIG. 4B, fan-shaped permanent magnets 53 are attached point symmetrically to the shaft 21. One of the permanent magnets 53 is arranged with the N pole at the rotor 52 side, while the other of the permanent magnets 53 is arranged with the S pole at the rotor 52 side. The rotor 52 forms the yoke part.

At the side of the shell 51 far from the motor 20, there is a ring-shaped yoke part 54 which is provided ratably with respect to the inner circumferential surface of the shell 51 via ball bearings 41. The yoke part 54 is not connected to the shaft 21. The share 21 runs through a hole which is provided at the center part. At the surface of the yoke part 54 at the rotor 52 side, permanent magnets 55 of the same size as the permanent magnets 53 which are attached to the rotor 52 are attached. One of the permanent magnets 55 is arranged with the N pole at the rotor 52 side, while the other permanent magnet 55 is arranged with the S pole at the rotor 52 side. Therefore, between the permanent magnets 55 and the permanent magnets 53, an attraction force acts. The permanent magnets 55 and the permanent magnets 53 are at facing positions. Further, the yoke part 54 to which the permanent magnets 55 are attached is held rotably inside the shell 51 by ball bearings 41, so if the shaft 21 rotates and the permanent magnets 53 move by rotating, the permanent magnets 55 move by rotating following the same.

At the space inside the shell 51 sandwiched between the permanent magnets 53 and the permanent magnets 55, there is a container mount 57 which is not connected to the shaft 21. At the container mount 57, as illustrated in FIG. 4C, a plurality of material containers 25 in which a magnetocalorific effect material is filled are attached in a radial manner. The cross-sectional shape of material containers 25 in a direction vertical to the flow of the heat transport medium is rectangular or circular. The container mount 57 may be formed integrally with the shell 51, or a separate container mount 57 may be attached to the inside of the shell 51. At the outside and inside parts of the material containers 25, discharge/intake valve mechanisms 56 with built-in discharge valves 27 and intake valves 28 are provided. In the third embodiment, each of the discharge/intake valve mechanisms 56 at the outside is connected to the medium passage 46A which is provided with a heat exchanger 45A, while each of the discharge/intake valve mechanisms 56 at the inside is connected to the medium passage 46B which is provided with a heat exchanger 45B.

In the third embodiment as well, if the permanent magnets 53 which are attached to one surface of the rotor 52 rotate by the motor 20, along with rotation of the permanent magnets 53, the rotary magnets 55 which face the permanent magnets 53 rotate following them due to the attraction force and therefore the yoke part 54 rotates. The point of the intensity of the magnetic field which is applied to the magnetocalorific effect material 26 which is filled in the material containers 25 is improved 30 to 60% compared with the case where permanent magnets 53 are provided only at one side of the magnetocalorific effect material 26 is the same.

Figure 5A:
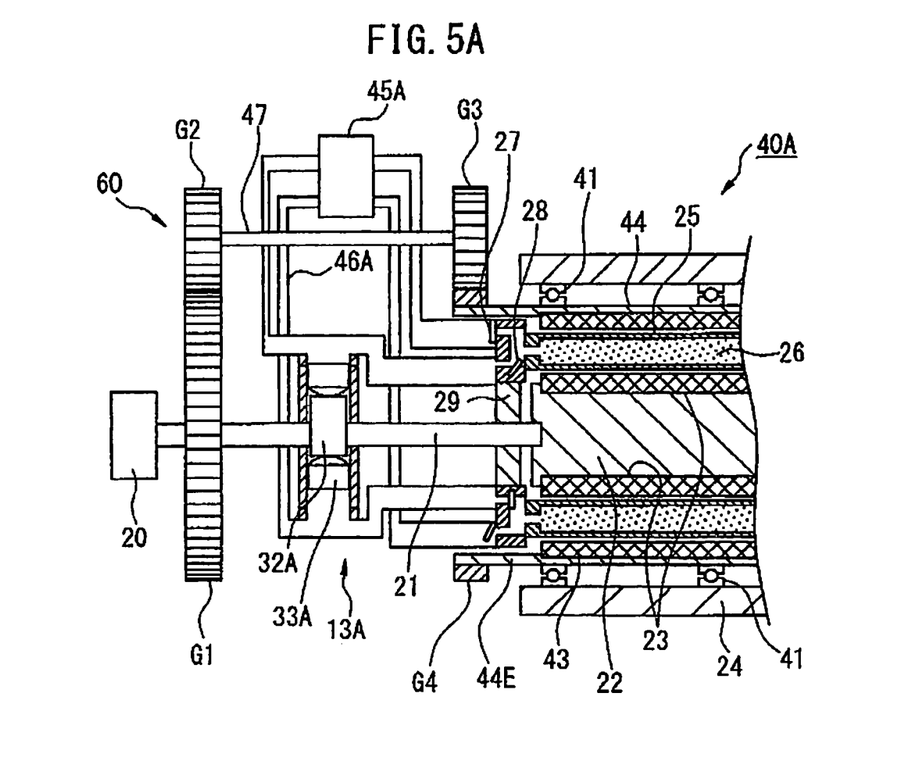
FIG. 5A is a partial cross-sectional view which illustrates a fourth embodiment of the magnetic heat pump system which is illustrated in FIG. 1.

FIG. 5A is a cross-sectional view of a magnetic heat pump 40A which illustrates a fourth embodiment in the magnetic heat pump system 30 which is illustrated in FIG. 1. The configuration of the magnetic heat pump 40A of the fourth embodiment is almost the same as the configuration of the magnetic heat pump 40 of the second embodiment. The only point of difference is the point of provision of a drive mechanism 60 of the yoke part 44 which forcibly makes the yoke part 44 rotate from the outside. Accordingly, illustration of the right half of the magnetic heat pump 40A not provided with the drive mechanism 60 of the yoke part 44 is omitted. Further, the end face plate 29 need only be attached to the shell 24 so as not to interfere with the ring gear G4.

Figure 5B:
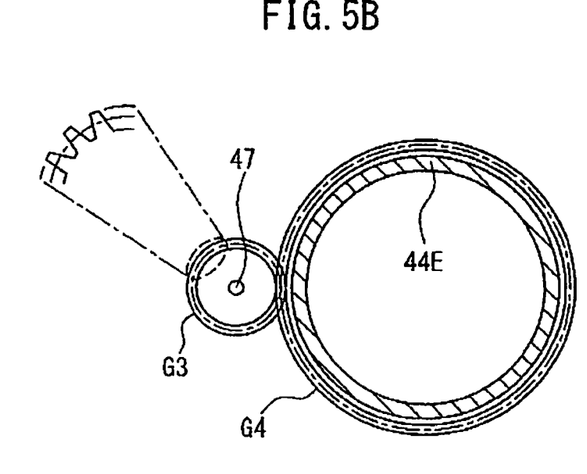
FIG. 5B is a plan view which illustrates the configuration of a drive gear of FIG. 5A.

In the fourth embodiment, one end of the cylindrical yoke part 44 is extended to the end face plate 29 by the extended part 44E. The ring gear G4 is attached to the outer circumferential part of the end part of the extended part 44E. On the other hand, a large diameter first gear G1 is attached to the shaft 21 between the reciprocating pump 13A and the motor 20. Further, the first gear G1 and the ring gear G4 are connected by the second and third gears G2 and G3 which are attached to the two ends of the drive shaft 47. That is, if the first gear G1 rotates, the second gear G2 which meshes with the first gear G1 rotates and the third gear G3 which is connected to the second gear G2 by the drive shaft 47 rotates. The third gear G3 meshes with the ring gear G4, so the ring gear G4 rotates. FIG. 5B illustrates the part where the third gear G3 and the ring gear G4 mesh. The rotational speed of the first gear G1 and the rotational speed of the ring gear G4 can be determined by adjustment of the number of teeth of the first to third gears.

If making the cylindrical yoke part 44 rotate by the drive mechanism 60, it is possible to make the permanent magnets 43 rotate more accurately matching the rotation of the permanent magnets 23 compared with making the permanent magnets 43 rotate by the attraction force of the permanent magnets 23.

Figure 5C:
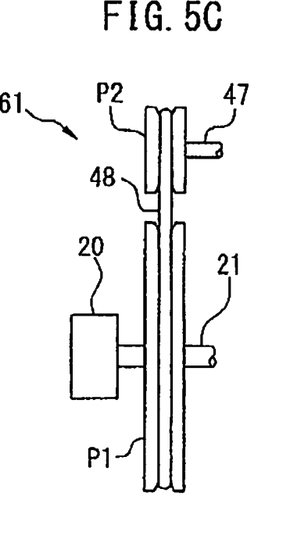
FIG. 5C is a partial side view which illustrates the configuration of a pulley mechanism which can be installed instead of the gear mechanism of FIG. 5A.

Furthermore, as a modification, instead of the first and second gears G1 and G2 at the drive mechanism 60, it is possible to use the belt mechanism 61 which is illustrated in FIG. 5C to drive the yoke part 44. The belt mechanism 61 is provided with pulleys P1 and P2 which are attached to the shaft 21 and the drive shaft 47 and a belt 48 which is laid between the pulleys 21 and 22. The rotation of the shaft 21 can be transmitted to the drive shaft 47 by the belt mechanism 61 in this way.

Figure 6:
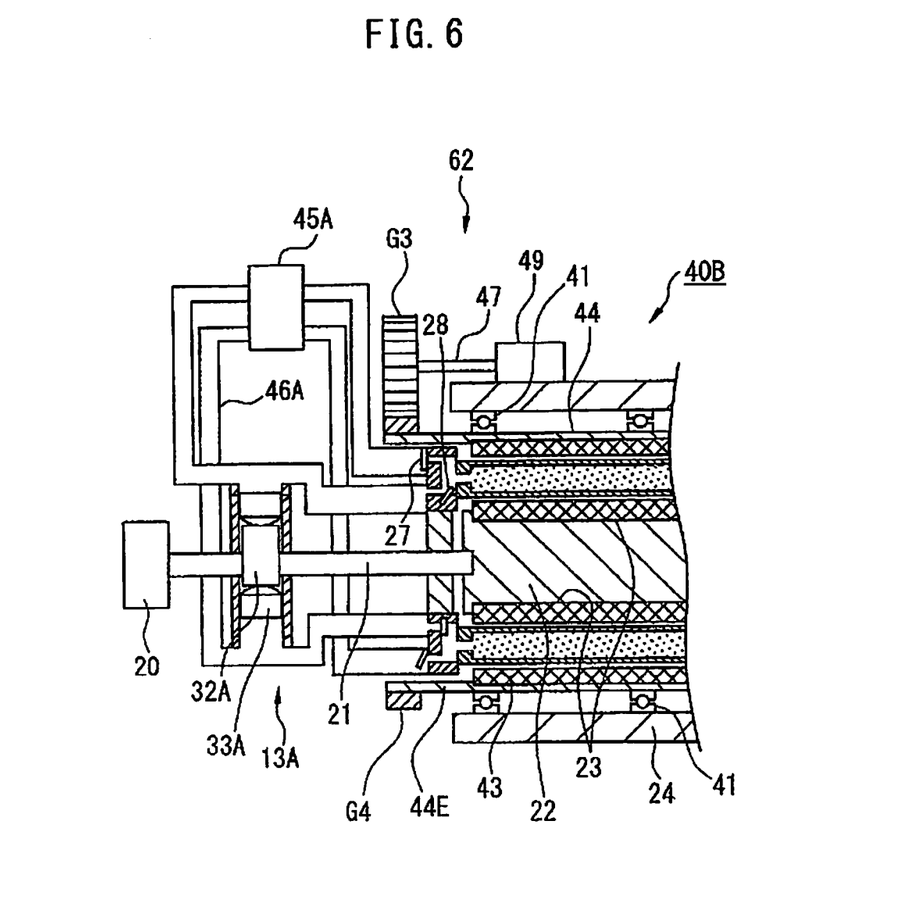
FIG. 6 is a partial cross-sectional view which illustrates a fifth embodiment of the magnetic heat pump system which is illustrated in FIG. 1.

FIG. 6 is a cross-sectional view of a magnetic heat pump 40B which illustrates a fifth embodiment in the magnetic heat pump system 30 which is illustrated in FIG. 1. The configuration of the magnetic heat pump 40B of the fifth embodiment is almost the same as the configuration of the magnetic heat pump 40 of the second embodiment. The only point of difference is the provision of the drive mechanism 62 of the yoke part 44 which forcibly makes the yoke part 44 rotate from the outside. Accordingly, illustration of the right half of the magnetic heat pump 40B not provided with the drive mechanism 62 of the yoke part 44 is omitted.

In the fifth embodiment, one end of the cylindrical yoke part 44 is extended to the outside of the end face plate 29 by the extended part 44E. The ring gear G4 is attached to the outer circumferential part of the extended part 44E. This configuration is the same as the fourth embodiment. In the fourth embodiment, a large diameter first gear G1 was attached to the shaft 21 and the rotation of the first gear G1 was transmitted by the second and third gears G2, G3 which were attached to the two ends of the drive shaft 47 to the ring gear G4. On the other hand, the fifth embodiment differs in the point of the drive shaft 47 of the third gear G3 which meshes with the ring gear G4 being the shaft of the motor 49 which is set at the outer circumferential surface of the shell 24.

In the fifth embodiment, if the motor 49 rotates, the shaft of the motor 49, that is, the drive shaft 47, rotates and the third gear G3 rotates, so the ring gear G4 meshing with this rotates. In this way, if making the cylindrical yoke part 44 rotate according to the drive mechanism 62, compared with making the permanent magnets 43 rotate by the attraction force of the permanent magnets 23, it is possible to make the permanent magnets 43 rotate more accurately in accordance with rotation of the permanent magnets 23. Further, the magnetic heat pump 40B of the fifth embodiment can rotate the cylindrical yoke part 44 by drive force from the outside, so has the same effect as the magnetic heat pump 40A of the fourth embodiment.

In the first to fifth embodiments explained above, the shaft 21 of the motor 20 is directly coupled with the magnetic heat pumps 40, 40A, 40B and 50, so the rotational speeds of the rotors 22, 52 were the same as the rotational speed of the motor 20. On the other hand, in the second to the fifth embodiments, the reciprocating pumps 13A, 13B are provided at the two sides of the magnetic heat pumps 40, 40A, 40B, and 50. Therefore, in the second, fourth, and fifth embodiments, if providing a gear box at the shaft 21 between the reciprocating pumps 13A, 13B and the magnetic heat pumps 40, 40A, 40B, and 50, the rotational speed of the rotor 22 can be made different from the rotational speed of the motor 20. This will be explained using FIG. 7 to FIG. 9.

Figure 7:
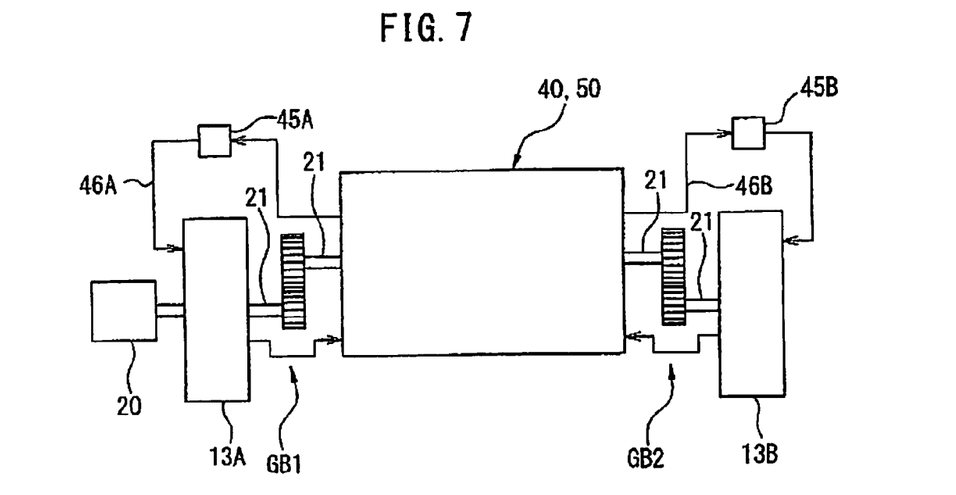
FIG. 7 is a view which illustrates the configuration of a modified embodiment of a second embodiment which is illustrated in FIG. 3.

FIG. 7 is a view which illustrates a configuration of a modified embodiment common to the magnetic heat pump 40 of the second embodiment which is illustrated in FIG. 3 and the magnetic heat pump 50 of the third embodiment which is illustrated in FIG. 5. In this embodiment, a gear box GB1 is provided at the shaft 21 between the reciprocating pump 13A and the magnetic heat pump 40, 50 while a gear box GB2 is provided at the shaft 21 between the magnetic heat pump 40, 50 and the reciprocating pump 13B. The gear ratios of the gear boxes GB1 and GB2 are 2:1. If the motor 20 turns two times, the rotor at the center of the magnetic heat pump 40, 50 turns once. The rotational speed of the reciprocating pump 13B is the same as the rotational speed of the reciprocating pump 13A.

Figure 8:
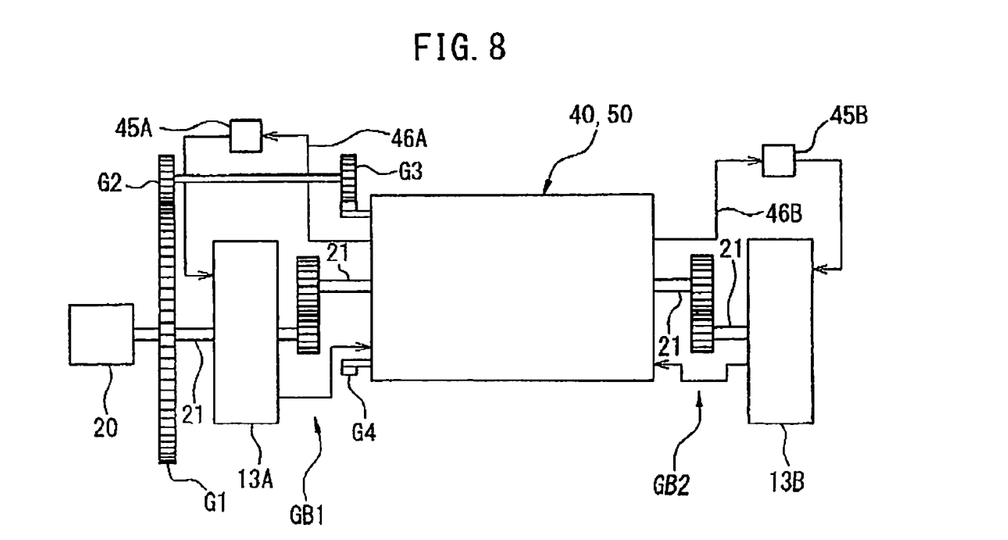
FIG. 8 is a view which illustrates the configuration of a modified embodiment of a fourth embodiment which is illustrated in FIG. 5A.

FIG. 8 is a view which illustrates a configuration of a modified embodiment of a magnetic heat pump 40A of a fourth embodiment which is illustrated in FIG. 5. In this embodiment as well, a gear box GB1 is provided at the shaft 21 between the reciprocating pump 13A and the magnetic heat pump 40, while a gear box GB2 is provided at the shaft 21 between the magnetic heat pump 40 and the reciprocating pump 13B. The gear ratios of the gear boxes GB1 and GB2 are 2:1. If the motor 20 turns two times, the rotor at the center of the magnetic heat pump 40A turns once. The rotational speed of the reciprocating pump 13B is the same as the rotational speed of the reciprocating pump 13A.

Figure 9:
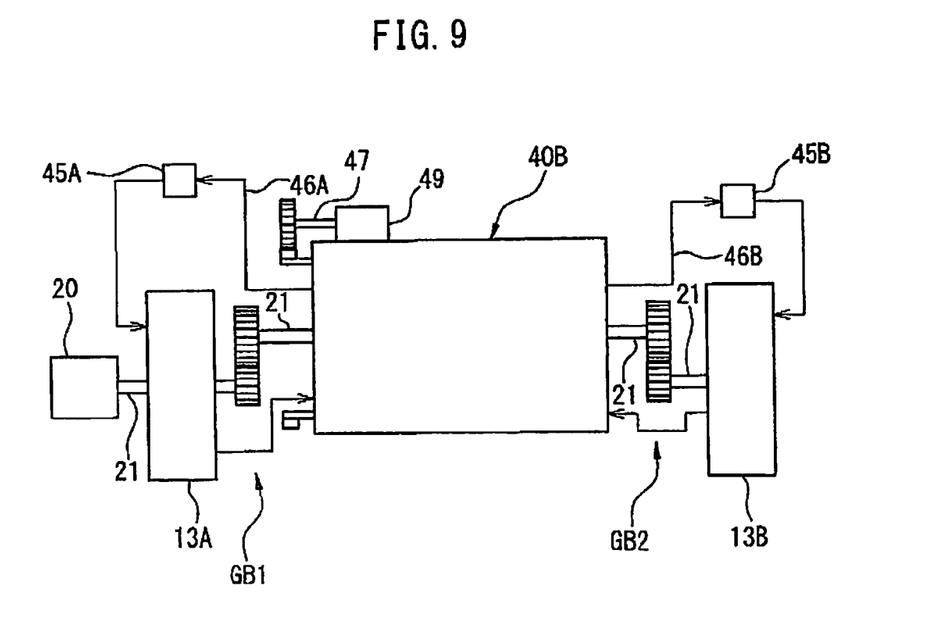
FIG. 9 is a view which illustrates the configuration of a modified embodiment of a fifth embodiment which is illustrated in FIG. 6.

FIG. 9 is a view which illustrates a configuration of a modified embodiment of a magnetic heat pump 40B of a fifth embodiment which is illustrated in FIG. 6. In this embodiment as well, a gear box GB1 is provided at the shaft 21 between the reciprocating pump 13A and the magnetic heat pump 40, while a gear box GB2 is provided at the shaft 21 between the magnetic heat pump 40 and the reciprocating pump 13B. The gear ratios of the gear boxes GB1 and GB2 are 2:1. If the motor 20 turns two times, the rotor in the magnetic heat pump 40B turns once. The rotational speed of the reciprocating pump 13B is the same as the rotational speed of the reciprocating pump 13A.

In the above three modified embodiments, the gear ratios of the gear boxes GB1 and GB2 are 2:1, but by changing the gear ratios of the gear boxes GB1 and GB2, it is possible to change the rotational speed of the rotor with respect to one turn of the motor 20.

According to the magnetic heat pump system of the present invention, it is possible to increase the changes in the magnetic flux which is applied to the magnetocalorific effect material or the changes in the magnetic flux which is removed from the magnetocalorific effect material. Further, it is possible to increase the heating amount and cooling amount of the magnetic heat pump system and possible to make the magnetic heat pump system high in efficiency. Furthermore, the heating ability and cooling ability at the air-conditioning system are improved.

While the invention has been described by reference to specific embodiments chosen for purposes of illustration, it should be apparent that numerous modifications could be made thereto by those skilled in the art without departing from the basic concept and scope of the invention.

What is claimed is:

1. A magnetic heat pump system which comprises a magnetic heat pump comprising: a cylindrical shell both ends of which are covered with two end face plates respectively inside of which there are provided a plurality of material containers inside of which a magnetocalorific effect material which has a magnetocalorific effect is arranged and inside of which a heat transport medium circulates, a magnetic field changing mechanism changing a magnitude of a magnetic field which is applied to the magnetocalorific effect material, and a heat transport medium moving mechanism making the heat transport medium move back and forth between two ends of the material containers, a heat absorbing mechanism making the heat transport medium which is discharged from one end side of the material containers absorb heat of an outside, and a heat radiating mechanism radiating to the outside the heat which the heat transport medium discharged from the other end side of the material containers has, wherein the magnetic field changing mechanism is provided with a shaft positioned inside of a circular arrangement of the material containers both ends of which extend through and are rotatably held by apertures in each of the two end face plates respectively, first magnets and a first yoke which are arranged on the shaft, which is held by the two end face plates provided at the ends of the cylindrical shell of the magnetic heat pump, the two end face plates rotationally holding the shaft so as to rotate the first magnets and a first yoke inside of the circular arrangement of the material containers, second magnets and a second yoke which are arranged between outside of the material containers and inside of the shell so as to face the first magnets with different poles,
 a first drive mechanism which is provided outside of the shell and rotates the shaft, and
 a holding mechanism provided between outside of the second yoke and inside of the shell which holds the second magnets and the second yoke so that the second magnets and the second yoke independently rotate separately from the shaft and the first magnets and rotate by following the first magnets and the first yoke by an attraction force acting between the first magnets and the second magnets.

2. The magnetic heat pump system according to claim 1, wherein said holding mechanism is a bearing, a lubricating oil, or an air layer.

3. The magnetic heat pump system according to claim 1, wherein said second yoke to which said second magnets are attached is driven from the outside by an outside drive mechanism.

4. The magnetic heat pump system according to claim 2, wherein said second yoke to which said second magnets are attached are driven from the outside by an outside drive mechanism.

5. The magnetic heat pump system according to claim 3, wherein said outside drive mechanism is driven by said first drive mechanism.

6. The magnetic heat pump system according to claim 4, wherein said outside drive mechanism is driven by said first drive mechanism.

7. The magnetic heat pump system according to claim 3, wherein said outside drive mechanism is driven by a second drive mechanism separate from said first drive mechanism.

8. The magnetic heat pump system according to claim 4, wherein said outside drive mechanism is driven by a second drive mechanism separate from said first drive mechanism.

9. The magnetic heat pump system according to claim 1, wherein
 said material containers and said magnetic field changing mechanism are respectively provided at the two sides of said heat transport medium moving mechanism, and
 one of said material containers is connected to said heat absorbing mechanism, while an other of said material containers is connected to said heat radiating mechanism.

10. The magnetic heat pump system according to claim 8, wherein
 said material containers and said magnetic field changing mechanism are respectively provided at the two sides of said heat transport medium moving mechanism, and
 one of said material containers is connected to said heat absorbing mechanism, while an other of said material containers is connected to said heat radiating mechanism.

11. The magnetic heat pump system according to claim 1, wherein said heat transport medium moving mechanism is provided at the two ends of said material containers as a first heat transport medium moving mechanism and a second heat transport medium moving mechanism.

12. The magnetic heat pump system according to claim 8, wherein said heat transport medium moving mechanism is provided at the two ends of said material containers as a first heat transport medium moving mechanism and a second heat transport medium moving mechanism.

13. The magnetic heat pump system according to claim 1, wherein
said first drive mechanism is a motor which is provided with a shaft,
said first magnets are provided in at least one set of two magnets with different facing polarities at point symmetric positions with respect to said shaft, and
said material containers are arranged in a ring-shaped region sandwiched between said first magnets and said second magnets.

14. The magnetic heat pump system according to claim 12, wherein
said first drive mechanism is a motor which is provided with a shaft,
said first magnets are provided in at least one set of two magnets with different facing polarities at point symmetric positions with respect to said shaft, and
said material containers are arranged in a ring-shaped region sandwiched between said first magnets and said second magnets.

15. The magnetic heat pump system according to claim 13, wherein said material containers are arranged in said ring-shaped region so that a direction of flow of said heat transport medium becomes parallel to said shaft.

16. The magnetic heat pump system according to claim 14, wherein said material containers are arranged in said ring-shaped region so that a direction of flow of said heat transport medium becomes parallel to said shaft.

17. The magnetic heat pump system according to claim 6, wherein said material containers are arranged in said ring-shaped region so that a direction of flow of said heat transport medium becomes vertical to said shaft.

18. The magnetic heat pump system according to claim 14, wherein said material containers are arranged in said ring-shaped region so that a direction of flow of said heat transport medium becomes vertical to said shaft.

19. The magnetic heat pump system according to claim 11, wherein
said first drive mechanism is a motor which is provided with a shaft,
said first magnets are provided in at least one set of two magnets with different facing polarities at point symmetric positions with respect to said shaft,
said material containers are arranged in a ring-shaped region sandwiched between said first magnets and said second magnets, and
gear boxes are provided which change the rotational speed of said shaft between said first heat transport medium moving mechanism and the one end side of said material containers and between said second heat transport medium moving mechanism and the other end side of said material containers.

20. An air-conditioning system which uses a magnetic heat pump system according to claim 1, wherein
the heat absorbing mechanism is arranged as a cooler unit at an upstream side of a cooling passage of an air-conditioning system and wherein
the heat radiating mechanism is arranged as a heater unit in a heating passage which is positioned at a downstream side of an air mix damper which controls an amount of intake of air-conditioned air which passes through the heat absorbing mechanism.

21. The magnetic heat pump system according to claim 1, wherein:
the first magnets are separated from the second magnets; and
both the first magnets and the second magnets are rotatable.

22. A magnetic heat pump system according to claim 1, wherein
the magnetic heat pump is connected to the heat transport medium moving mechanism and the heat radiating mechanism through a plurality of valves provided in the end face plates in a circular arrangement manner, and
the drive mechanism is positioned outside of the end face plate and coupled with the shaft so as to rotate the first magnets and the first yoke.

* * * * *